(12) United States Patent
Wenzel et al.

(10) Patent No.: US 12,246,501 B2
(45) Date of Patent: Mar. 11, 2025

(54) HEATING PRESS AND METHOD FOR VULCANIZING A VEHICLE TIRE IN SAID HEATING PRESS UNDER VACUUM

(71) Applicant: Continental Reifen Deutschland GmbH, Hannover (DE)

(72) Inventors: Karsten Wenzel, Helpsen (DE); Horst Wedekind, Garbsen (DE); Michael Ramm, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 90 days.

(21) Appl. No.: 18/247,906

(22) PCT Filed: Oct. 4, 2021

(86) PCT No.: PCT/DE2021/200141
§ 371 (c)(1),
(2) Date: Apr. 5, 2023

(87) PCT Pub. No.: WO2022/073566
PCT Pub. Date: Apr. 14, 2022

(65) Prior Publication Data
US 2023/0382067 A1 Nov. 30, 2023

(30) Foreign Application Priority Data
Oct. 5, 2020 (DE) .................... 10 2020 212 548.1

(51) Int. Cl.
*B29D 30/06* (2006.01)
(52) U.S. Cl.
CPC ..... *B29D 30/0601* (2013.01); *B29D 30/0605* (2013.01); *B29D 30/0662* (2013.01); *B29D 30/0629* (2013.01)
(58) Field of Classification Search
CPC . B29D 30/0605; B29D 30/0629; B29D 30/06
See application file for complete search history.

(56) References Cited

U.S. PATENT DOCUMENTS 3,730,658 A    5/1973 Marra
4,508,497 A *  4/1985 Beres ................. B29D 30/0605
                                           425/29
(Continued)

FOREIGN PATENT DOCUMENTS

CN      117245956 A * 12/2023 ............. B29C 33/46
DE    102023204308 A1 * 11/2024
(Continued)

OTHER PUBLICATIONS

The International Search Report and the Written Opinion of the International Searching Authority mailed on Dec. 23, 2021 for the counterpart PCT Application No. PCT/DE2021/200141.

*Primary Examiner* — Benjamin A Schiffman
(74) *Attorney, Agent, or Firm* — Richard A. Wolf; Gregory Adams

(57) ABSTRACT

A heating press (1) for vulcanizing a vehicle tire under a vacuum,
comprising a heating press upper part (3) and a heating press lower part (6), wherein a container (2) having the mold parts (14, 16, 17, 18, 21) of a segmented vulcanizing mold and a cylindrical hood upper part (4) enclosing said container are arranged on the heating press upper part (3),
wherein the hood upper part (4) and the heating press upper part (3) can be moved independently of one another and relative to one another in the axial direction (P1),
wherein the cylindrical hood upper part (4) has a length (23) which is sufficient to form a closed hood interior space (12) with the heating press lower part (6) and heating press upper part (4) when the heating press upper part (3) is open,
wherein at least one respective vacuum-tight seal (5) is.

11 Claims, 2 Drawing Sheets

(56) References Cited

U.S. PATENT DOCUMENTS

| | | | | |
|---|---|---|---|---|
| 4,563,139 | A * | 1/1986 | Yokoyama | B29D 30/0605 425/32 |
| 5,145,688 | A | 9/1992 | Ohtake | |
| 5,196,206 | A * | 3/1993 | Troia | B29C 33/02 425/210 |
| 6,406,360 | B1 * | 6/2002 | Nguyen | B24C 3/06 451/92 |
| 6,923,879 | B1 * | 8/2005 | Blickwedel | B29D 30/72 156/130.7 |
| 7,056,109 | B2 * | 6/2006 | Kata | B29D 30/0629 425/46 |
| 7,527,489 | B2 * | 5/2009 | Steinke | B29C 39/42 425/546 |
| 7,963,756 | B2 * | 6/2011 | Bachochin | B29D 30/0605 425/46 |
| 10,493,665 | B2 * | 12/2019 | Wenzel | B29D 30/0606 |
| 10,821,688 | B2 * | 11/2020 | Stoila | B29C 33/202 |
| 11,752,717 | B2 * | 9/2023 | Takahashi | B29C 33/02 425/28.1 |
| 2010/0282387 | A1 * | 11/2010 | Wenzel | B60C 11/00 152/209.15 |
| 2011/0262572 | A1 * | 10/2011 | Fricke | G01J 5/00 425/29 |
| 2022/0143942 | A1 * | 5/2022 | Takahashi | B29C 33/10 |
| 2023/0373176 | A1 * | 11/2023 | Wenzel | B29D 30/0605 |
| 2023/0373177 | A1 * | 11/2023 | Wenzel | B29D 30/0662 |
| 2023/0405951 | A1 * | 12/2023 | Wenzel | B29D 30/0601 |
| 2024/0042714 | A1 * | 2/2024 | Wenzel | B29D 30/0601 |
| 2024/0173931 | A1 * | 5/2024 | Pierre | B29D 30/0605 |

FOREIGN PATENT DOCUMENTS

| | | | | |
|---|---|---|---|---|
| EP | | 1495848 A1 | 1/2005 | |
| JP | | 2010179638 A * | 8/2010 | |
| WO | WO-2021223822 A1 * | 11/2021 | | B29D 30/0601 |

* cited by examiner

HEATING PRESS AND METHOD FOR VULCANIZING A VEHICLE TIRE IN SAID HEATING PRESS UNDER VACUUM

BACKGROUND OF THE INVENTION

The invention relates to a heating press for vulcanizing a vehicle tire, comprising a heating press upper part and a heating press lower part, wherein a container having the mold parts of a vulcanizing mold and a cylindrical hood upper part enclosing said container are arranged on the heating press upper part, and wherein the heating press upper part and the heating press lower part are connected to the container in such a way that, when the heating press upper part is being lowered through a stroke that takes place in the axial direction, the mold parts of the vulcanizing mold can be closed in the radial direction. The invention furthermore relates to a method for vulcanizing a green tire in this abovementioned heating press.

The above-described heating press is a standard heating press for vulcanizing vehicle tires under atmospheric conditions.

The heating press comprises a so-called container which comprises the actual segmented vulcanizing mold with the mold segments and sidewall shells and bead rings, which mold the tire. Furthermore, heating chambers are provided for controlling the temperature of the molding parts. During the vulcanization, the container is surrounded by a closed hood which, in the prior art, serves primarily for temperature insulation during the vulcanization.

In order to as far as possible avoid defects on the tire surface, the air between the surface of the green tire and the shaping surface of the mold parts of the vulcanizing mold must be removed. For this purpose, it is generally known for 1000 to 5000 ventilation valves to be provided in the mold parts. By means of these ventilation valves, the air from the mold cavity is discharged radially and axially outward through ventilation channels. However, the mold parts of a new vulcanizing mold have to be equipped with these valves. Furthermore, these valves tend to become dirty owing to rubber that ingresses from the tire for vulcanization, such that said valves have to be exchanged or cleaned, which requires great outlay.

BRIEF SUMMARY OF THE INVENTION

The invention is based on the object of providing a heating press for vulcanizing a vehicle tire, with which vehicle tires can be reliably vulcanized without the need for ventilation valves in the vulcanizing mold. The object of the invention is likewise to provide a method for vulcanizing a vehicle tire in an efficient manner in terms of time by means of the heating press mentioned above.

The object is achieved in relation to the heating press in that
- the hood upper part and the heating press upper part can be moved independently of one another and relative to one another in the axial direction,
- the cylindrical hood upper part has a length which is sufficient to form a closed hood interior space with the heating press lower part and heating press upper part when the heating press upper part is open,
- at least one respective vacuum-tight seal is arranged on those surfaces at which the hood upper part directly adjoins the heating press upper part and—when the hood interior space is closed—the heating press lower part, in order to make the closed hood interior space sealable in a vacuum-tight manner, wherein the seals are preferably arranged on the heating press upper part and on the heating press lower part,
- in the course of a first stroke, the hood upper part can be moved independently of the heating press upper part in the axial direction in such a way that said hood upper part forms a vacuum-tight hood interior space with the heating press lower part, although the vulcanizing mold remains open in an air-permeable manner,
- a pump and a vacuum tank, by means of which a vacuum can be generated in the interior space of the hood after the first stroke, are provided, wherein the vacuum tank and the pump are connected to the interior space of the hood, and wherein the vacuum tank and the pump are connected to one another, and
- in the course of a second stroke, the heating press upper part can be moved independently of the hood upper part in the axial direction in such a way that the vulcanizing mold can be completely closed under vacuum conditions in the interior space of the hood.

It is essential that the heating press according to the invention is used to vulcanize vehicle tires under vacuum. The vulcanizing mold itself does not have any ventilation means for ventilating the mold cavity. The 1000 to 5000 ventilation valves arranged in the vulcanizing mold in the prior art, through which ventilation valves the air from the mold cavity is discharged radially to the outside, are omitted by virtue of the vulcanization being performed under a vacuum. In this way, post-processing of the rubber flash that is formed on the tire by the ventilation means, and an exchange and/or cleaning of ventilation valves that are no longer functional, are no longer necessary. These are time-consuming and expensive. Furthermore, by virtue of the vulcanization being performed under a vacuum, the vulcanized tire takes on an external form which is absolutely free from defects and is thus of perfect appearance.

The vacuum that can be obtained inside the closed hood interior space after the first stroke of the hood upper part serves to remove the air from the not-yet closed vulcanizing mold, in particular between the outer surface of the tire and the mold surfaces of the molding parts of the vulcanizing mold. After the second stroke of the heating press upper part, which takes place under vacuum conditions in the hood interior space, the vulcanizing mold can be completely closed. The tire for vulcanization can be manufactured with high quality and without defects. In this respect, in order to form the vacuum-tight hood interior space, in one embodiment of the invention the end face of the hood upper part can move onto the heating press lower part or, in another embodiment of the invention, it can be moved over the heating press lower part, with the result that the end of the hood upper part encloses the heating press lower part.

Of course, to obtain a vacuum-tight hood interior space, the hood or heating press can have further seals. It is explicitly the intention that no modifications with regard to measures for providing vacuum-tightness be made to the container or to the vulcanizing mold itself.

The term "vacuum" refers to air pressure in the range from 950 mbar (abs) to 0.1 mbar (abs).

The ring seal preferably has a circular or polygonal cross section.

It is expedient if a hydraulic, pneumatic or electric actuator, which can move the hood upper part in the axial direction, is provided.

In a certain embodiment of the invention, a hood lower part in the form of a circular ring is arranged on the heating press lower part, wherein the circular ring of the hood upper part and the circular ring of the hood lower part have the same inside diameter and the same outside diameter and are arranged in line with one another in the heating press. This results in very reliable sealing of the hood interior space.

It is expedient if the seals are ring seals with circular, polygonal and/or flat cross sections.

It is expedient for reliable sealing if the ring seal is arranged in a circular-ring-shaped groove, wherein the diameter of the ring seals is slightly greater than the depth of the groove. Slightly greater means that the seal, when installed into the groove and in the sealing state, is compressed by at most 40% in relation to the compression-free geometry of the seal. Through the exact design of the groove in relation to the seal geometry, damage to the seal(s) is additionally prevented and durability is improved.

In one embodiment of the invention, the ring seals consist of solid material. The solid material may consist of one or more materials that are known for seals, such as FKM or FFKM. These seals are inexpensive and easy to handle.

In another embodiment of the invention, the ring seal is a hose of variable diameter. This has the advantage that less load is exerted on the ring seal, and said ring seal is enlarged in terms of diameter only when the sealing action is necessary.

It is advantageous if the ring seals are differentially inflated double ring seals. This has the advantage that any leakage can be compensated with low levels of pump power.

It is expedient if the vacuum tank has a volume that is approximately 5 to 10 times greater than the volume of the closed hood (including mold, container, green tire, heating bellows). It is hereby ensured that a vacuum can be reliably generated in the hood. Furthermore, the time required for the generation of the required vacuum is significantly reduced. This may take place in the course of the normal loading and unloading process.

With regard to the method with an abovementioned heating press, the invention is achieved in that the following steps are performed in succession:
a) loading the opened heating press by placing the green tire for vulcanization into the container,
b) moving the hood upper part through a first stroke in the axial direction toward the heating press lower part, until a closed hood interior space composed of hood upper part, heating press upper part and heating press lower part is obtained, while the vulcanizing mold remains open,
c) only if the ring seal is a hose of variable diameter: inflating the circular-ring-shaped hose seal in order to seal off the hood interior space in a vacuum-tight manner,
d) opening the connection between the vacuum tank and the hood interior space in order to generate a partial vacuum, by way of pressure equalization between the vacuum tank and the hood interior space, in the hood interior space that has been closed in a vacuum-tight manner,
e) when the partial vacuum is obtained in the hood interior space: closing the connection between the vacuum tank and the hood interior space, opening the connection between the hood interior space and the pump, and pumping the remaining air out of the hood interior space in order to generate the vacuum,
f) moving the heating press upper part through a second stroke, in the course of which the container is moved in such a way that the vulcanizing mold is completely closed, and subsequently closing the connection between the hood interior space and the pump,
g) vulcanizing the green tire and opening the connection between the pump and the vacuum tank and generating a vacuum in the vacuum tank, wherein the connection of the pump to the hood interior space and the connection of the vacuum tank to the hood interior space are each closed,
h) opening the heating press by moving the hood upper part and the heating press upper part and removing the fully vulcanized tire,
and repeating the steps a)-h) in order to vulcanize each further tire.

BRIEF DESCRIPTION OF THE SEVERAL VIEWS OF THE DRAWINGS

It is advantageous if, to facilitate step h), this is preceded by a further valve arranged in the hood being opened in order to deplete the vacuum in the hood and subsequently being closed again.

An exemplary embodiment of a heating press and the method for vacuum vulcanization of a pneumatic vehicle tire, together with further advantages, will be described on the basis of the following two schematic figures. In the figures.

DETAILED DESCRIPTION OF THE INVENTION

Figure 1:
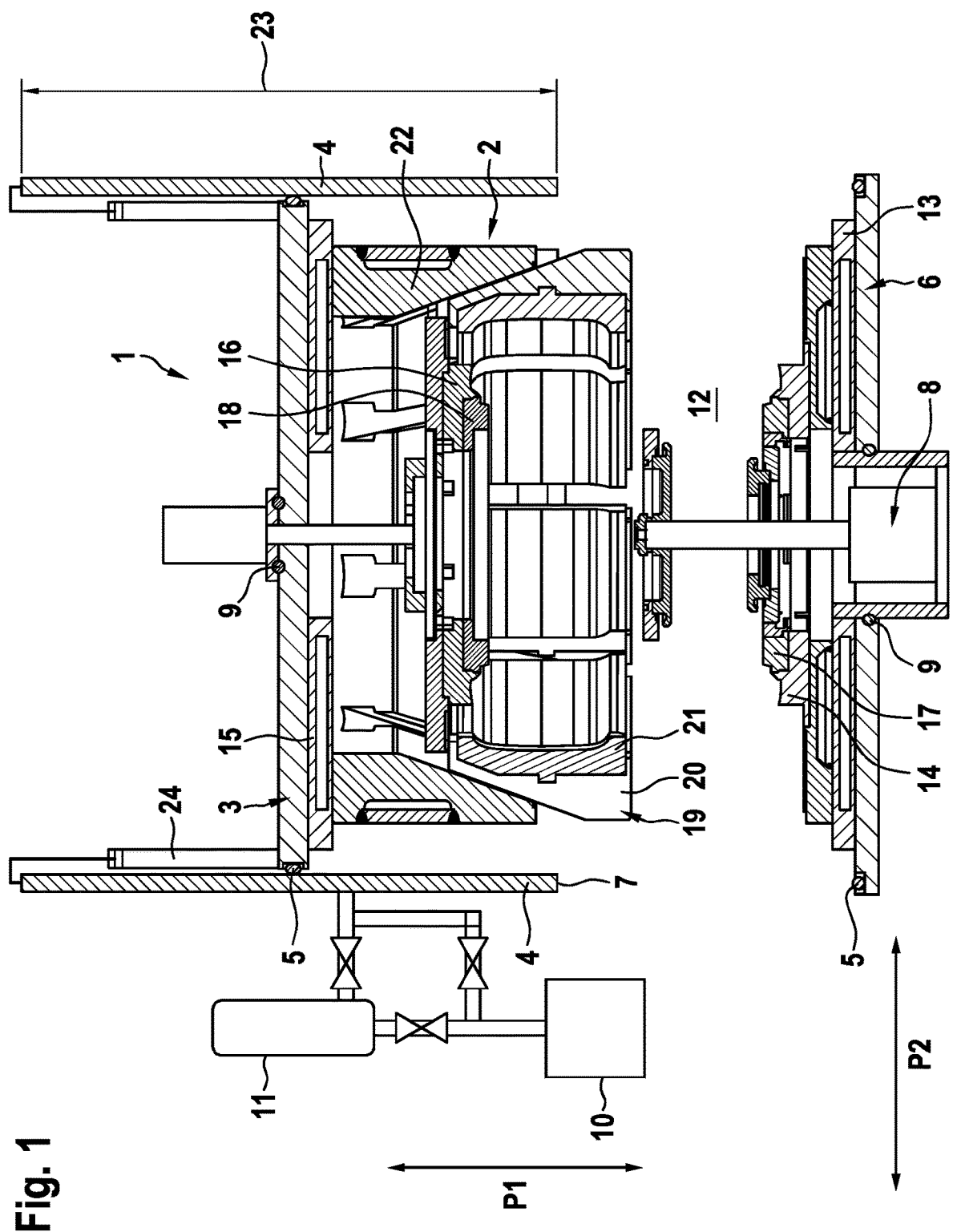
FIG. 1 shows a heating press according to the invention with a container in an open state.

FIG. 1 shows a heating press 1 according to the invention with a container 2 in an open state. The hood upper part is in its initial position. The green tire can be placed into the heating press 1.

The heating press 1 comprises a heating press lower part 6 and a heating press upper part 3 with a cylindrical hood upper part 4 and has the corresponding mechanisms for positioning the tire for vulcanization, for actuating the constituent parts of the vulcanizing mold, for introducing the heating media, and for removing the fully vulcanized tire. In the interior space of the hood upper part 4, a container 2 is arranged on the heating press upper part 3 in such a way that, when the heating press upper part 3 is being moved in the axial direction P1, the mold parts of the vulcanizing mold that are arranged in the container can be moved in the radial direction P2.

What is provided is a "central mechanism" 8, to which a heating bellows (not illustrated) that can be placed into the green tire (not illustrated) is fastened. Furthermore, nozzles (not illustrated) are arranged on the central mechanism 8, through which nozzles a heating medium can be introduced into the heating bellows (not illustrated).

The hood upper part 4 and the heating press upper part 3 can be moved independently of one another and relative to one another in the axial direction P1. The cylindrical hood upper part 4 has a length 23 which is sufficient to form a closed hood interior space 12 with the heating press lower part 6 and heating press upper part 3 when the vulcanizing mold is still open, that is to say when the heating press upper part 3 has not been moved completely onto the heating press lower part 6.

The hood upper part 4 is airtight, or vacuum-tight, and in the closed state forms a vacuum-tight hood interior space 12. In order to seal the end face 7 of the hood upper part 4 in a vacuum-tight manner in the closed state, a ring seal 5 with a flat cross section is arranged on the heating press lower part 6 where the end face 7 of the hood upper part 4 rests against the heating press lower part 6 in the closed state of the hood. A further ring seal 5 is mounted on the heating press upper part 3 where the hood upper part 4 directly adjoins the heating press upper part 3. Further ring seals 9 seal off at least the central mechanism 8 with respect to the hood interior space 12 in a vacuum-tight manner.

The container 2 is a conventional container 2 that is already known in the prior art.

The container 2 contains the segmented vulcanizing mold with a lower heating plate 13, a lower sidewall shell 14, an upper heating plate 15, an upper sidewall shell 16, a lower bead ring 17 and an upper bead ring 18. Those constituent parts of the vulcanizing mold that are moved in a vertical (=axial) direction (arrow P1) for the purposes of opening and closing include the segment ring 19, composed of seven to nine segment shoes 20, and the profile/mold segments 21 fastened thereto and also the upper sidewall shell 16 with the upper bead ring 18. The segment shoes 20 are moved apart radially, in the direction of the arrow P2, to close and open the vulcanizing mold. On the upper heating plate 15, there is arranged a closing ring 22 which has a beveled inner surface which interacts with beveled outer surfaces of the segment shoes 20 of the segment ring 19 such that, during the closing of the vulcanizing mold, the segment shoes 20 are moved together in a radial direction to form the closed segment ring 19. In the lower heating plate 13, the upper heating plate 15 and in the closing ring 22, there are incorporated heating chambers into which at least one heating medium, in particular saturated steam (water vapor), is introduced for the vulcanization of the tire. In this way, the green tire (not illustrated) is heated from the outside via the segment shoes 20, the sidewall shells 14, 16 and the bead rings 17, 18, such that this heating is commonly referred to as external heating.

A conventional heating bellows (not illustrated) is provided in a known manner and is filled with at least one pressurized heating medium in order to center the green tire in the mold from the inside, wherein the heating bellows is brought into a toroidal shape conforming to a tire. Since the green tire is heated by means of the heating bellows from the inside, this type of heating is referred to as internal heating.

In the course of a first stroke $H_1$—not illustrated in the figures—the hood upper part 3 can be moved independently of the heating press upper part 3 in the axial direction P1 by means of an actuator 24 in such a way that said hood upper part forms a vacuum-tight hood interior space 12 with the heating press lower part 6, although the vulcanizing mold remains open in an air-permeable manner.

With the first stroke $H_1$ performed by the hood upper part 4, however, the heating press upper part 3 can also be moved at the same time—although the vulcanizing mold must still remain open after the first stroke $H_1$.

A pump 10 and a vacuum tank 11, by means of which a vacuum can be generated in the interior space 12 of the hood after the first stroke $H_1$, are provided. The vacuum tank 11 and the pump 10 are connected to the interior space 12 of the hood and the vacuum tank 11 and the pump 10 are connected to one another. By virtue of a vacuum being provided in the hood interior space (=interior space of the hood) 12, in particular during the molding and the vulcanization of the tire, conventional ventilation valves arranged in the mold face of the vulcanizing mold are omitted entirely.

Figure 2:
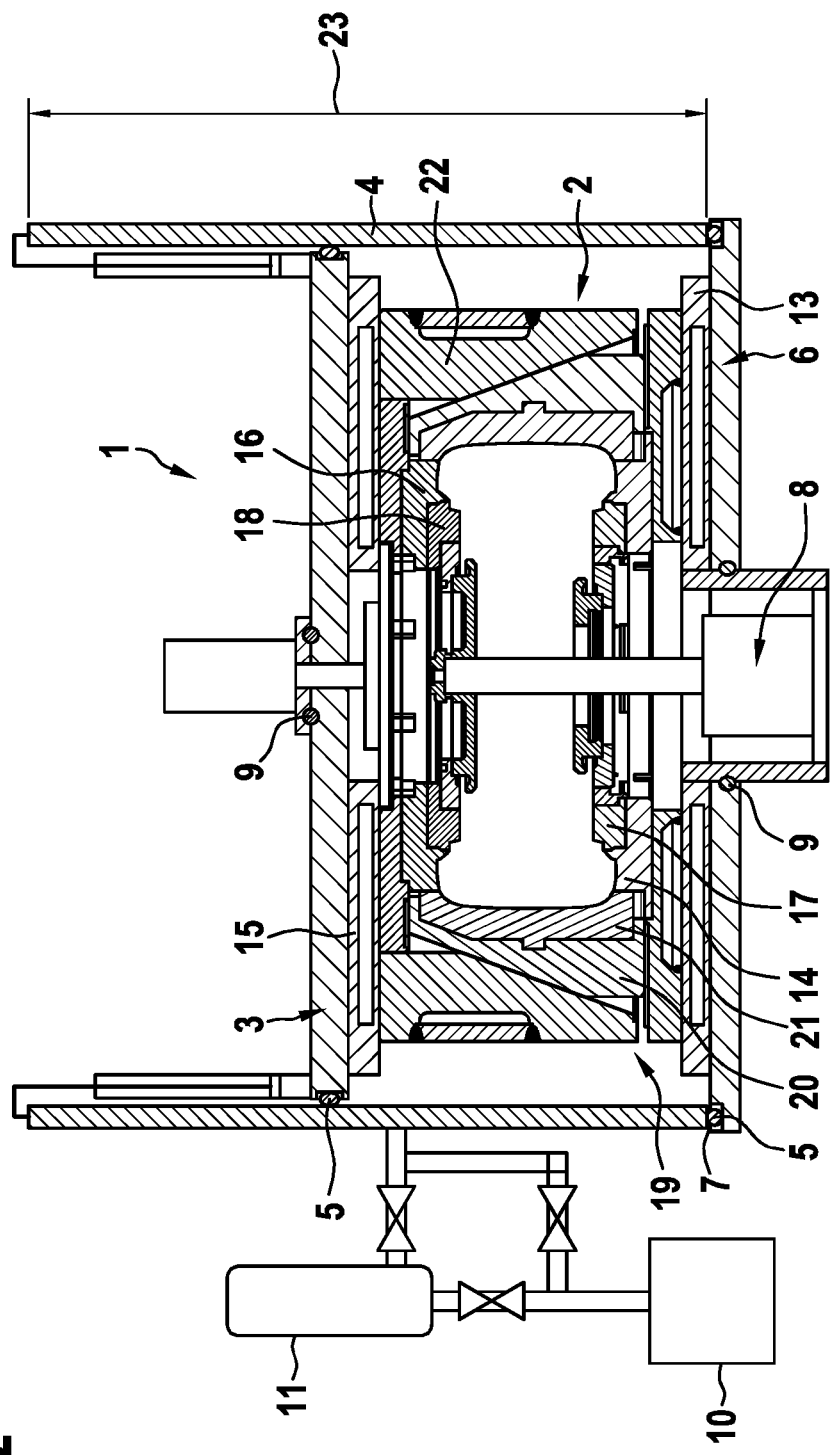
FIG. 2 shows the heating press of FIG. 1 in the closed state.

FIG. 2 shows the heating press 1 of FIG. 1 in the closed state, which is obtained after a second stroke $H_2$, in the course of which the heating press upper part 3 can be moved independently of the hood upper part 4 in the axial direction P1 such that the vulcanizing mold can be completely closed under vacuum conditions in the interior space 12 of the hood. The connection between the vacuum tank 11 and the hood interior space 12 is closed. Then, the connection between the hood interior space 12 and the pump 10 is closed. The green tire is vulcanized.

In the case of a passenger motor vehicle tire, the vulcanization thereof takes approximately 15 minutes. During this time, the connection between pump 10 and vacuum tank 11 is opened in order to generate a vacuum in the vacuum tank 11, wherein the connection of the pump 10 to the hood and the connection of the vacuum tank 11 to the hood are each closed. After the vulcanization of the tire is complete, the volume of the hood interior space 12 is aerated via a valve (not illustrated), and the heating press 1 is opened in order to unload the fully vulcanized tire from the container 2 having the vulcanizing mold. For this purpose, the heating press upper part 3 with the container 2 and the hood upper part 4 moves upward, and the profile segments 21 simultaneously move outward in the radial direction P2. The tire is released.

The invention claimed is:

1. A heating press for a tire, the heating press comprising:
a heating press upper part;
a heating press lower part;
a container and mold parts of a segmented vulcanization mold in the container;
a cylindrical hood upper part of a hood of the heating press upper part, the cylindrical hood upper part enclosing the container,
the heating press upper part being movable in an axial direction (P1) through a stroke such that the mold parts of the vulcanization mold are closable in a radial direction;
the hood upper part and the heating press upper part are movable independently relative to one another in the axial direction:
the cylindrical hood upper part has a length which is sufficient to form a closed hood interior space with the heating press lower part and heating press upper part when the heating press upper part is open:
at least one seal configured to establish vacuum-tightness between the heating press upper part and the heating press lower part when the hood interior space is closed;
a pump configured to generate a vacuum in the closed hood interior space;
wherein the hood upper part is movable independently of the heating press upper part in the axial direction (P1) in a first stroke so that said hood upper part forms the vacuum-tight hood interior space with the heating press lower part, while the vulcanizing mold remains open in an air-permeable manner,
wherein the heating press upper part is movable independently of the hood upper part in the axial direction (P1) in a second stroke so that the mold parts move in the radial direction and completely close the vulcanizing mold under vacuum in the closed hood interior space.

2. The heating press of claim 1, wherein a hydraulic, pneumatic or electric actuator (24), which can move the hood upper part (4) independently of the heating press upper part (3) in the axial direction (P1), is provided.

3. The heating press of claim 1, wherein a hood lower part in the form of a circular ring is arranged on the heating press lower part (6), wherein the circular ring of the hood upper part (3) and the circular ring of the hood lower part have the same inside diameter and the same outside diameter and are arranged in line with one another in the heating press (1).

4. The heating press of claim 1, wherein the seals are ring seals (5, 9) with circular, polygonal and/or flat cross sections.

5. The heating press of claim 4, wherein the ring seal (5, 9) is arranged in a circular-ring-shaped groove, wherein a diameter of the ring seal (5, 9) is slightly greater than a depth of the groove.

6. The heating press of claim 4, wherein the ring seal (5, 9) consists of solid material.

7. The heating press of claim 4, wherein the ring seal (5, 9) is a hose of variable diameter.

8. The heating press of claim 4, wherein the ring seal (5, 9) is a differentially inflated double ring seal.

9. The heating press of claim 1, wherein the vacuum tank (11) has a volume that is approximately 5 to 10 times greater than a volume of the closed hood.

10. A method for vulcanizing a pneumatic vehicle tire under a vacuum in a heating press (1), the method comprising:

providing the heating press according to claim 1, and operating the heating press including the steps:
a) loading the opened heating press (1) by placing the green tire for vulcanization into the container (2),
b) moving the hood upper part (4) through the first stroke (H1) in the axial direction (P1) toward the heating press lower part (6), until a closed hood interior space (12) composed of the hood upper part (4), the heating press upper part (3) and the heating press lower part (6) is obtained, while the vulcanizing mold remains open,
d) opening the connection between a vacuum tank (11) and the hood interior space (12) in order to generate a partial vacuum, by way of pressure equalization between the vacuum tank (11) and the hood interior space (12), in the hood interior space (12) that has been closed in a vacuum-tight manner,
e) when the partial vacuum is obtained in the hood interior space (12): closing the connection between the vacuum tank (11) and the hood interior space (12), opening the connection between the hood interior space (12) and the pump (10), and pumping the remaining air out of the hood interior space (12) in order to generate the vacuum,
f) moving the heating press upper part (3) through the second stroke (H2), in the course of which the container (2) is moved in such a way that the vulcanizing mold is completely closed, and subsequently closing the connection between the hood interior space (12) and the pump (10),
g) vulcanizing the green tire and opening the connection between the pump (10) and the vacuum tank (11) and generating a vacuum in the vacuum tank (11), wherein the connection of the pump (10) to the hood interior space (12) and the connection of the vacuum tank (11) to the hood interior space (12) are each closed,
h) opening the heating press (1) by moving the hood upper part (4) and the heating press upper part (3) and removing the fully vulcanized tire,
and repeating the steps a)-h) in order to vulcanize each further tire.

11. The method of claim 10, further comprising arranging a further valve in the hood in order to deplete the vacuum prior to opening the heating press.

* * * * *